United States Patent [19]
Guilbert et al.

[11] Patent Number: 6,075,072
[45] Date of Patent: Jun. 13, 2000

[54] LATENT COATING FOR METAL SURFACE REPAIR

[75] Inventors: Curtis R. Guilbert; David G. Enos; Charles E. Boyer, III, all of Austin, Tex.

[73] Assignee: 3M Innovative Properties Company, St. Paul, Minn.

[21] Appl. No.: 09/042,263

[22] Filed: Mar. 13, 1998

[51] Int. Cl.[7] ............................. C08J 3/00; C08K 9/00; C08L 83/00; B05D 7/00; B32B 5/16

[52] U.S. Cl. .................... 523/200; 427/213; 428/402.21; 523/202; 523/205; 524/86; 524/91; 524/137; 524/211

[58] Field of Search ................................... 523/200, 202, 523/205; 524/86, 91, 137, 211; 428/402.21; 427/213

[56] References Cited

U.S. PATENT DOCUMENTS

| | | | |
|---|---|---|---|
| 3,505,244 | 4/1970 | Cessna et al. | 252/391 |
| 4,329,381 | 5/1982 | Eschwey et al. | 427/386 |
| 4,471,109 | 9/1984 | Watase et al. | 528/272 |
| 4,980,414 | 12/1990 | Naton | 525/30 |
| 5,102,457 | 4/1992 | Braig et al. | 106/14.16 |
| 5,534,289 | 7/1996 | Bilder et al. | 427/8 |
| 5,561,173 | 10/1996 | Dry | 523/218 |
| 5,575,841 | 11/1996 | Dry | 106/711 |
| 5,660,624 | 8/1997 | Dry | 106/677 |

FOREIGN PATENT DOCUMENTS

| | | | |
|---|---|---|---|
| 2 221 684 | 2/1990 | United Kingdom | C08J 3/20 |

OTHER PUBLICATIONS

D.Gupta, "Encapsulated Corrosion Inhibitors," *Reviews on Corrosion Inhibitor Science and Technology*, NACE (1993), pp. II–15–1 to II–15–15.

V.Agarwala & J. DeLuccia, "Microencapsulated Crack Arrestment Compounds and Corrosion Inhibitors for Organic Coatings," *Proceedings of the Symposium on Advanced in Corrosion Protection by Organic Coatings*, Cambridge, England (Apr. 11–14, 1989), pp. 437–450.

C. Dry, "Procedures Developed for Self–Repair of Polymer Matrix Composite Materials," *Composite Structures* 35 (1996), Elsevier Science Ltd., pp. 263–269.

C. Dry, "Concrete Durability Enhancement by Internal Timed Release of Antifreeze or Anticorrosion Chemicals for Increased Resistance to Freeze/Thaw and Corrosion," *9th Int'l Congress on the Chemistry of Cement*, Nat'l Council for Cement & Building Materials, New Delhi (1992), pp. 276–281.

C. Dry, "Alteration of Matrix Permeability and Associated Pore and Crack Structure by Timed Release of Internal Chemicals," *Ceramic Transactions vol. 16*, American Ceramic Society, Inc., pp. 729–768.

G. Williams III, "Smart Materials", *Omni vol. 15, No. 6*, Omni Publications Int'l (Apr. 1993), pp. 44–48, 91.

C. Dry, "Smart Materials for Sensing and/or Remedial Action to Reduce Damage to Materials," *ADPA/AIAA/ASME/SPIE Conference on Active Materials and Adaptive Structures*, Institute of Physics Publishing (1991), pp. 191–195.

*Primary Examiner*—Patrick D. Niland
*Attorney, Agent, or Firm*—Darla P. Fonseca

[57] ABSTRACT

A corrosion protective coating composition, applied over a metal surface, contains frangible microcapsules which rupture and release fluid upon impact or other stress likely to damage the coating. The fluid, from the microcapsules, contains a film forming component to cover the damaged area of the coating and a corrosion inhibitor for the metal surface.

19 Claims, No Drawings

LATENT COATING FOR METAL SURFACE REPAIR

FIELD OF THE INVENTION

The invention relates to in situ repair of protective coatings for metal component surfaces which may become damaged by careless handling or stressful environments after application of the coatings. The repair is achieved using materials incorporated into the protective coatings. Specifically, useful materials preferably take the form of fluid formulations contained within frangible microcapsules. If coating damage occurs, the microcapsules fracture to release the fluids, which include anticorrosive agents and film forming components, in the immediate vicinity of the damage. The fluid flows over exposed areas of the metal surface and fills any voids or cracks in the coating to renew the protective barrier over the metal.

BACKGROUND TO THE INVENTION

There are many situations and applications where metal structures become subject to oxidative corrosion and ultimately fail to fulfill their intended purpose. Examples of failure by metal corrosion include deterioration of heat exchanger elements, corrosion of pipeline distribution systems and especially the gradual disintegration of steel used for reinforcing concrete structures such as bridge decks and frames which support a wide range of modern buildings.

Newly constructed metal structures typically have a protective treatment against corrosion. As the structures age, protection diminishes and corrosion processes occur. A deterrent to such processes would delay the onset of corrosion, especially if the deterrent exerted its effect later in the lifetime of the reinforced structures. Treatments to delay the onset of corrosion, as disclosed in subsequent prior art references, include application of corrosion inhibitors or protective coatings directly to the metal surface or release of protective agents into a matrix material.

U.S. Pat. No. 4,329,381 discloses a method for protecting metal surfaces with compositions containing a corrosion-protective amount of a five- or six-membered nitrogen-heterocyclic compound containing at least one zinc or lead salt and a suitable film-forming vehicle such as an alkyd or epoxy resin. Representatives of the heterocyclic compounds include hydantoin, 2-mercaptothiazole, 2-mercaptobenzoxazole and 2-mercaptobenzothiazole. U.S. Pat. No. 5,102,457 discloses anticorrosive surface coatings incorporating S-benzylated derivatives of 2-mercaptobenzothiazole as corrosion inhibitors. Epoxy resins, alkyd, acrylic, melamine, polyurethane or polyester resins or mixtures thereof provide suitable film-forming binders for the corrosion inhibitors disclosed.

U.S. Pat. No. 3,505,244 encapsulates a combination of corrosion inhibitor and anti-leak agents and thereafter processes the encapsulated material into a free-flowing powder. When added to cooling water, circulating in heat exchanger systems, the powder deters conditions associated with developing corrosion sites in the metal structure. Suitable corrosion inhibitors include benzotriazole, benzimidazole and derivatives and mixtures thereof. Encapsulated inhibitors may be introduced at any time during the life of a heat exchanger system.

Previous metal corrosion inhibiting compositions addressed the control or delay of corrosion either by incorporating dry inhibitor in a protective film applied to the metal surface or, as exemplified by U.S. Pat. No. 3,505,244, delivering inhibitor from capsules circulating in cooling water. The use of dry inhibitors, alone, is inefficient due to restrictions on the concentration of inhibitor for optimum coating properties and the inability of remedial material to migrate to the corrosion site. In the case of the encapsulated corrosion inhibitor, circulating in the water of heat exchangers, it appears that protective action occurs after the onset of damage when the exchanger has already sprung a leak.

U.S. Pat. No. 5,534,289 discloses a method for monitoring structures for crack formation, such formation to be indicated by color development at a crack site. The monitoring process involves using dye filled microcapsules in a coating applied to the structure. The microcapsules fracture under stress associated with crack formation causing a change of color near a crack. The discoloration will be noticeable during regular inspection of the structure, providing evidence of the need for maintenance personnel to take remedial action. Although they provide a warning of structural deterioration, neither the coating nor the dye containing microcapsules include agents suitable for preventing further damage to the structure. Damage control depends, therefore, on how frequently the structure is inspected.

U.S. Pat. Nos. 5,561,173, 5,575,841 and 5,660,624 disclose shaped structures. e.g., concrete blocks, using matrix reinforcing hollow fibers containing fluids suitable for effecting repair as the matrices age and deteriorate. In the matrix of concrete, the fluid containing hollow fibers provide reinforcement and a delivery means for repair of the concrete and associated structures subject to corrosive deterioration. The repair process releases anticorrosive fluids to cracks and other structural imperfections developed in the concrete by the action of stress, moisture and other corrosive components. Release of remedial fluids from hollow fibers causes distribution of protective chemical in the proximity of a damaged section but not necessarily at the precise location where remedial action is required due to the separation of the structure from the metal where damage may occur.

None of the cited prior art teaches how to re-seal scarred coatings and renew protection to an area of metal surface that became exposed by abrasion, impact or other conditions that cause disruption of a bonded protective coating. This situation is remedied by the present invention using a latent, film forming, corrosion protective fluid composition contained in rupturable microcapsules. Combined with a film forming binder, the microcapsules provide a thin corrosion protective coating for metal surfaces. The protective fluid composition, contained in microcapsules, provides precise delivers of metal corrosion protection in the immediate neighborhood of the damage site produced by abuse of the protective coating. In contrast, the fluid containing hollow fibers previously discussed, while fulfilling their matrix reinforcing function, do not provide immediate contact with internal metal structural reinforcing elements such as rebar due to the positioning of the hollow fibers in shaped structures such as blocks, involving thick sections which prevent immediate access to metal surfaces when compared with coatings of the present invention. Further, the hollow fibers are unsuitable for thin coatings; their dimensions will interfere with smooth and effective coating application over metal.

Free-flowing powder coatings of the invention provide improved metal protection using self-repairing compositions located within 200 $\mu$m of the metal surface. Protective, microencapsulated components include anticorrosive chemicals, film forming components and marker dyes for visual identification of coating abuse or disruption.

SUMMARY OF THE INVENTION

The current invention provides coatings suitable for metal structures including pipes, bars, rod and other related components that require protection from corrosive materials and environments. A distinguishing feature of the invention is the presence of a latent protective material that reacts upon impact or similar damaging force to repair the coating at points where the underlying metal could become exposed.

Specifically corrosion preventing coatings of the invention comprise a film forming binder and a plurality of microcapsules containing a fluid system comprising a corrosion inhibitor, a film forming substance and optionally a marker dye. The microcapsules may contain only one component, or more of the components required to prevent corrosion. Where single component microcapsules are used, a plurality of each must be mixed together to fulfill the function of corrosion prevention.

The coatings may be applied by any one of several conventional coating methods. For powder coating compositions, all of these methods involve the application of heal to melt the powder and form a continuous protective coating and in most cases promote curing of the binder layer. It is surprising that the fluid containing capsules survive this process and are substantially uniformly distributed throughout the final resin coating. The contents of the capsules remain latent within the protective coating until disruption of the coating, by impact, abrasion or cutting or cracking, causes fracture of the capsule walls at the damage site. When this fracture occurs, the contents of the capsules leak into and spread through the damage sites in the coating. Each component within the capsules has a specific function. Release of the film forming component from the capsules results in delivery of the corrosion inhibitor and formation of a protective skin over the damage site. If present a dye marks the damaged area of the coating to allow for notice and more detailed repair, if required. In this way the coating compositions of the invention provide initial protection for coated metal components with capability for self-repair or self-healing at damage sites to maintain the integrity of the coating and extend the lifetime of the underlying metal structure.

The invention provides benefits compared to conventional coatings by delivering a film forming component combined with a corrosion inhibitor to re-establish protection of the metal surface even after substantial time has passed since the application of the coating. Unlike other coatings, the corrosion inhibitor is not exposed to contaminating agents within the environment that may react with it to potentially reduce the effectiveness thereof, because the microcapsule shell presents a barrier to degradation of its fluid contents.

A particular advantage of the use of microcapsules, ranging in size up to about 75 $\mu$m, preferably about 10 $\mu$m to about 40 $\mu$m, is the delivery of the coating repair components, at relatively high concentration, in a thin surface layer, less than 200 $\mu$m thick, immediately adjacent to the metal surface and the damage site thereon.

Terms used in the instant application have the meanings ascribed below.

1. The term "microcapsule" means a miniature container comprising a frangible wall material which confines the contents of the microcapsule until subjected to a force sufficient to fracture and fragment the wall material. The term may be shortened to "capsule" with no change in meaning.

2. The term "film forming binder" means a nonencapsulated constituent of the corrosion protective coating composition which holds other parts of the composition in a continuous layer after application to selected surfaces.

3. The term "corrosion protective layer" means the continuous layer produced by application of the protective coating composition to a selected surface.

4. The term "film forming component" means a liquid included inside microcapsules to coat and seal damaged or defective portions of a continuous protective layer when released during fracture of a microcapsule.

5. The term "latent repair fluid" refers to the fluid contents of a microcapsule which, included in the continuous protective layer, isolates the repair fluid until released by damage to the layer causing fracture of the microcapsule. The repair fluid remains latent in the layer until a damaging event occurs.

6. The term "interfacial polymerization" means a method for forming microcapsule walls at the interface between the aqueous phase and the non-aqueous phase.

All ranges, ratios and percents herein are by weight unless specifically noted otherwise.

DETAILED DESCRIPTION OF THE INVENTION

Coating compositions containing the latent repair components of the invention include dry free-flowing powders comprising primary components of about 80% to about 100% of a film forming binder mixed with from 1% to about 20% microcapsules. Within the microcapsules are fluid components for self-repair or self-healing of protective coatings applied to metal surfaces. In a preferred embodiments contain capsules including all desired repair components. In an alternate embodiment, the free flowing powder coating may contain mixtures of capsules each containing only one of the self-repairing components. As an example, one type of capsule in the mixture may contain a film forming sealant material that, upon capsule rupture, cures with a curative contained in a neighboring ruptured capsule.

Other material additives may be included for optimum storage and application characteristics of the powder coatings.

Film forming binders useful in compositions of the invention include epoxy, polyester, polyurethane, nylon and polyvinylfluorodiene resins; latex based or water dispersed resins such as acrylic, epoxy or alkyd resins and solvent-based vehicle systems such as alkyd polymer resins.

Protective film-forming layers may also be formed using adhesive coatings such as mastic coatings which are frequently used for protecting exposed surfaces of pipelines. Polymers used in mastics include acrylate polymers, coal tar epoxies and rubber-based mastics that may be applied from a solvent system such as an ethyl acetate/heptane mixture. Preferred film forming binders are advanced epoxy resins with SCOTCHKOTE SK 413S, available from Minnesota Mining & Mfg. Company (3M) of St. Paul, Minn., representing the most preferred film forming binder.

Useful encapsulated materials for repair include a film forming component, corrosion inhibitor and optionally a marker dye. Corrosion inhibitors suitable for encapsulation, either alone or in combination with film forming components and/or marker dyes, include water insoluble amines such as VERSAMINE 551 available from Henkel Inc. of Kankakee, Ill.; benzimidazole and substituted benzimidazoles including 1-methylbenzimidazole, 1-phenyl benzimidazole and 2-phenylbenzimidazole; substituted thiophosphates exemplified by diethylthiophosphate and dioctylthiophosphate; thiourea and substituted structures thereof, represented by allylthiourea, phenylthiourea, and 1,3-diphenylthiourea; benzothiazole, benzotriazole and alkyl, aryl, arakyl and other substituted versions thereof.

Preferred corrosion inhibitors include solvent solutions of metal salts of dinonylnaphthalene monosulfonic acids commercially available as barium-containing NACORR 1153 and zinc-containing NACORR 1553, from King Industries of Norwalk, Conn., and LUBRIZOL 219, a solvent solution of a zinc organophosphate compound, available from Lubrizol Inc. of Wickliffe, Ohio.

Film forming components used in capsules of the invention include water insoluble mercaptans, like LP-3, available from Norton Inc. of Chicago, Ill.; epoxy materials; tung oil; linseed oil; and light lubricating oils such as 3-IN-ONE oil available from WD-40 Corp. of San Diego, Calif. Effective, film-forming components include epoxy oligomers such as EPON 160 available from Shell Chemical of Houston, Tex. Preferred film formers include combinations of tung oil and linseed oil.

Marker dyes for use in the invention show solubility in phthalate esters and include hydrophobic dyes such as SUDAN YELLOW 146 or SUDAN BLUE, which are anthraquinone type dyes made by BASF of Mount Olive, N.J.

Materials for forming capsule walls comprise substances maintaining structural integrity to temperatures of at least 160° C. Suitable film formers, known to those of ordinary skill in the art, include cellulosic materials, copolymers, such as those produced by reaction of isobornyl methacrylate with acrylic acid or methacrylic acid, condensation polymers including nylon, polyurethane, polyurea and polycarbonate polymers. The preferred capsule wall material, of this type, is derived from urea, formaldehyde and melamine monomers. Use of interfacial polymerization techniques, produces continuous-wall, non-porous capsules comprising these monomeric species. As an alternative, a polyurethane shell material, also formed by interfacial polymerization, provides porous capsules which tend to gradually lose their fluid fill material. This type of capsule assures controlled corrosion protection until the capsule fill material is exhausted. Combined with the on-demand release of self-repairing components, this provides a very effective means for extending the lifetime of structures that are subject to corrosion. Urea-melamine-formaldehyde capsules provide the preferred capsule walls for containment of the latent repair components.

The fluid materials of the invention contained in the capsules must flow therefrom readily into coating defects, such as cracks or voids produced by impact or other damaging forces. This requires control of fluid viscosity less than 100 centipoise, preferably between about 10 centipoise and about 50 centipoise. The capsule size is less than 74 μm, with an optimum capsule size in the range of about 10 μm to about 40 μm. Suitable liquid diluents for viscosity adjustment include mineral spirits, butyl cellosolve, phthalate esters, dipentene, amyl acetate, benzothiazole, D-5 SILCONE OIL available from General Electric Co., Schenectedy N.Y., xylene and other hydrophobic solvents boiling at about 150° C. and capable of surviving at about pH 2.0.

Protective layers of the invention may be applied to selected surfaces using several processes. Some of these processes involve raising the surface temperature, of e.g. a steel bar, to above the temperature at which the coating composition will melt. The heated material is then dipped into a fluid bed of the coating composition or exposed to coating spray which may also be controlled electrostatically. Alternatively, the coating composition may be deposited onto a cold surface from an electrostatic fluid bed before raising the temperature of the surface causing the coating composition to flow and in some cases cure.

The preferred method for applying powder coatings of the invention requires establishing a fluid bed of the coating composition. A steel object is heated to a temperature of about 225° C. to about 235° C., then dipped in the fluidized bed of powder. At this temperature, the coating composition melts forming a protective layer containing microcapsules of latent repair fluid. Successful use of microcapsules in a fluidized bed may require addition of a flow agent to the powder coating composition. This addition usually involves treatment of the microcapsules with about 1% by weight to about 4% by weight of fumed silica, preferably CABOSIL M-5 available from the Cabot Corp. of Naperville, Ill. Microcapsules treated with fumed silica readily mix with the powdered binder of the coating composition. The powdered binder appears to produce smoother coatings in the presence of additional fumed silica.

Other flow enhancing agents, suitable for use with the current invention, include low molecular weight epoxy resins, such as EPON 828 and RSS-1407, both available from Shell Chemical of Houston, Tex. A particularly effective flow enhancing material is the solid reaction product formed when 2 moles of mercaptobenzothiazole react with 1 mole of diglycidyl aniline. When molten at 100° C. this material exhibits a viscosity from about 10 to about 15 centipoise. The use of mercaptobenzothiazole provides additional corrosion inhibitor which may be effective in augmenting inhibition contributed by the microcapsules.

Compositions of the invention may include other additives or adjuvants which may change the characteristics of coating formulations without detracting from their latent repair and corrosion inhibiting performance. For example, should it be desirable to include components to be released within a quick time frame, and/or via a controlled time release, porous capsules or capsules with orifices in the walls may also be included along with microcapsules providing the latent repair capacity.

The invention has been described with reference to particular embodiments, but variation within the spirit and the scope of the invention will occur to those skilled in the art.

EXPERIMENTAL

Determination of Onset of Corrosion

Coatings of SK 413S epoxy resin on steel bars were scored using a Dremel tool to give an X-cut having score marks approximately 1.6 mm wide. The cut areas were overcoated with a corrosion inhibitor composition to a depth of about 0.02 mm using a fine camel hair brush.

The resulting samples were placed in an air-sparged solution of 3% sodium chloride controlled at a temperature of 65.5° C.

The following table shows coating performance by recording the elapsed time in days before onset of corrosion of the sample steel bar.

TABLE 1

Inhibition of Onset of Corrosion of Steel Bars

| Inhibitor | Onset of Corrosion |
|---|---|
| LUBRIZOL 219 | 45 days |
| LUBRIZOL 2604 | 26 days |
| NACORR 1153 | 3.5 days |
| NACORR 1553 | 3.5 days |
| Two part epoxy | 14 days |
| Two part epoxy + NACORR 1153 | 100 days |
| Diglycidyl aniline/mercaptobenzothiazole adduct 50% by wt. in benzothiazole | 41 days |

Electrochemical Evaluation of Corrosion Protection Materials

Coating Preparation

Sample preparation, for electrochemical evaluation, involved dry polishing of mild steel coupons (2.22 cms in diameter and 0.32 cm thick) using 600-grit abrasive prior to degreasing with methanol. Degreased coupons received sequential treatments including application of a thin film of a candidate corrosion protection material, then removal of excess material by wiping with a lint-free cloth, followed by storage for 24 hours, at ambient conditions, to allow the coating to cure.

Electrochemical Testing

Coated samples, prepared as previously described, were evaluated electrochemically using anodic and cathodic potentiodynamic scans to assess corrosion rates in a 3.5% sodium chloride solution, adjusted with hydrochloric acid to pH 5.0. The equipment used for testing was an EG&G (EG&G Instruments, Princeton Applied Research, Oak Ridge, Tenn.) Model 273A potentiostat/galvanostat that used software control of data acquisition (i.e. CorrWare available from Scribner Associates, Inc., Pinehurst, N.C.) to perform potentiodynamic polarization scans in an EG&G model K0047 corrosion cell with a model K0105 flat sample holder that presented a working electrode with a surface area of precisely 1 $cm^2$.

The bath containing the sodium chloride solution provided the reservoir for a polarization cell that included the test or working electrode, two auxiliary electrodes, air inlet and outlet, and a Luggin capillary with salt-bridge connection to the reference cell which had a saturated calomel reference electrode connected to the working and auxiliary electrodes via a potentiostat. Testing proceeded after allowing approximately one hour for the cell to reach a steady state condition.

Each sample was evaluated using both anodic and cathodic polarization scans. Anodic scans started at a 30 mV negative bias relative to the open circuit potential, then proceeded, as in ASTM G-5, at a scan rate of 10 mV/minute until reaching either an applied potential of +1.0 volt versus the saturated calomel reference electrode or an applied current density of 50 mA/$cm^2$. Cathodic polarization scans proceeded in similar fashion from a positive to negative bias relative to open circuit voltage. A fresh sample was used for each scan.

Table 2 presents materials and their electrochemical testing results, calculated according to ASTM G-102, which project corrosion rate measured in $\mu$m/year. A rate of corrosion <100 $\mu$m/year is desirable for the self-repairing, corrosion protecting composition to be considered effective.

TABLE 2

Electrochemical Evaluation of Corrosion Protection Materials

| Material Combination | Corrosion Rate ($\mu$m/year) | Encapsulable | Relative Rank |
|---|---|---|---|
| 90% (1:1 Tung Oil:Linseed Oil) + 10% Lubrizol 219 | 2.134 | yes | Excellent |
| Tung Oil | 2.210 | no | Excellent |
| Nacorr 1153 | 2.362 | no | Excellent |
| 25% mercaptobenzothiazole/ Diglycidylaniline adduct + 75% Benzothiazole | 3.810 | no | Excellent |
| 90% (2:1 Tung Oil:Linseed Oil) + 10% Lubrizol 219 | 4.318 | yes | Excellent |
| 90% (2:1 Tung Oil:Linseed Oil) + 10% Nacorr 1153 | 5.588 | yes | Excellent |
| Mercaptobenzothiazole/ Diglycidylaniline flash coat | 37.85 | no | Good |
| 25% Nonyl Catechol Novolac + 75% Benzothiazole | 50.80 | yes | Good |
| Lubrizol 219 | 85.09 | yes | Good |
| Irgacor 153 (Ciba Geigy) | 107.19 | no | Poor |
| Polyethylenedioxythiophene (PEDOT) | 125.48 | no | Poor |
| Limonine Dioxide | 141.99 | yes | Poor |
| Calcium Nitrite (24 hr soak in 30% soln.) | 168.91 | no | Poor |
| Diaminobenzoic Acid | 192.79 | no | Poor |
| Bare Iron Surface | 244.86 | N/A | N/A |

Preparation of Microencapsulated Coating Repair Materials

Microcapsule preparation requires a precondensate solution containing ingredients for the capsule wall. Suitable ingredients include urea, melamine and formaldehyde. After aging for several hours the precondensate material, stirred at high speed in a polyethylene-lined vessel, provides the dispersion phase for the capsule fill material which is added as a solution of film forming component and corrosion inhibitor. At room temperature, under acidic conditions, agitation of the suspension proceeds for 3 hours with formation of the microcapsule shell wall around the fill material. At this point the temperature of the mixture is raised to about 60° C. for an additional 3 hours. Following this heating, the pH is adjusted to a slightly alkaline condition. After cooling the filled microcapsules are filtered from the residual liquid, oven dried at 60° C., dried at room temperature under a vacuum of about 500 millitorr for 48 hours and finally classified to isolate the fraction passing through a 70-mesh screen.

EXAMPLE 1

Microcapsule Preparation

| Precondensate Composition | |
|---|---|
| Urea | 155.21 g |
| Melamine | 27.39 g |
| Formaldehyde | 484.20 g |
| Potassium tetraborate | 160.00 g |
| Water | 831.60 g |

The ingredients for the precondensate composition were combined in a suitable vessel and mixed with stirring at a temperature of 75° C. for 2.5 hours. Thereafter the precondensate composition aged for a period of 24 hours.

| Aqueous Dispersion Phase Composition | |
| --- | --- |
| Water | 282.33 g |
| Precondensate Composition | 313.80 g |
| Carboxymethylcellulose | 1.26 g |
| Sodium Sulfate | 59.61 g |
| 25% Glutaric Dialdehyde | 4.35 g |

The aqueous dispersion phase composition was charged to a polyethylene lined cylindrical reactor having four baffles vertically disposed at equidistant points around its internal wall. A turbine stirrer operating at 2400 rpm provided agitation of the dispersion phase.

| Capsule Fill Composition | |
| --- | --- |
| EPON 160 | 23.09 g |
| Benzothiazole | 103.9 g |
| NACORR 1153 | 103.9 g |

The non-aqueous capsule fill composition, when added to the dispersion phase, formed microscopic droplets under the influence of the rapidly rotating turbine stirrer. After stabilization of the dispersion, a 20% solution of sulfuric acid was used to establish pH 2 in the stirring mixture. This condition was maintained for 3 hours at room temperature. The next phase of microcapsule preparation required acidity adjustment to pH 1.9 using 20% sulfuric acid. Following this adjustment the temperature of the dispersion was increased to 60° C. and the reaction continued for 3 hours longer. When this time expired, a 20% solution of sodium hydroxide was added to the dispersion to establish pH 7.5. With capsule formation completed, the dispersion was allowed to cool to room temperature before filtering, using Buchnar filtration equipment, to isolate capsules which were then twice washed with deionized water. Finally the capsule slurry was spread on a paper substrate for drying at 60° C. for 4 hours prior to transfer to a room temperature vacuum dryer which operated at 500 millitorr for 48 hours.

Powder Coating Composition Preparation

Powder coating compositions include free-flowing microcapsules comprising about 99% by weight of microcapsules, as previously described, and 1% flow agent such as Cabosil M-5, available from Cabot Industries of Tuscola, Ill., agitated in a paint shaker to provide intimate mixing of the capsules and flow agent. This free-flowing powder was mixed with a dry powdered epoxy resin, such as SCOTCHKOTE—SK 413S available from 3M (St. Paul, Minn.) at a ratio of 10% dry microcapsules to 90% epoxy resin powder. The combined powders were mixed using a paint shaker, classified via a 70 mesh screen and finally dried at room temperature under reduced pressure of 500 millitorr for 72 hours.

Application of Coatings to Steel

A fluidized bed was made of powders formed according to Example 1 using a standard porous plate fluid bed arrangement. Coated steel (bend) bars were produced by heating the bars to 232° C. for 45 minutes before dipping them into the fluidized powder for approximately 0.5 second. At this temperature the powder melted to form a continuous coating of about 0.1 mm on the steel bar.

Immediately after removal of the coated bar from the fluidized powder of the invention, it was dipped into a second fluid bed containing SCOTCHKOTE SK413S powder. The duration of the second coating operation was about 2.5 seconds to apply an overcoat layer of epoxy about 0.3 mm thick. Thereafter the dual layer coating was subjected to a temperature of 232° C. for 5 minutes during which time the epoxy resin cured fully.

Salt Solution Immersion Test

The uncoated portions of the previously coated steel bars received a protective coating of two-part epoxy Skotchcote 312 (available from 3M—St. Paul, Minn.) which was then allowed to cure for 24 hours.

Test Sample 1

The microcapsule-containing protective coating of a test bar, prepared as described previously, was cross-cut to penetrate the coating and reveal the underlying bare metal surface. This sample was immersed in 3% sodium chloride solution supplied with an air sparge system. After 170 hours of immersion, the sample began to show signs of corrosion in the cross-cut area.

Comparison 1

A test bar was prepared in similar fashion to Test Sample 1 except for the omission of microcapsules from the initial fluidized bed composition. This sample, after cross-cutting and immersion in 3% sodium chloride solution, showed evidence of corrosion in about 43 hours suggesting that the latent repair system of the invention more than doubles the effective lifetime of the of the metal protective coatings.

What is claimed is:

1. A corrosion protective coating composition, comprising:
   a) a film forming binder, and
   b) a plurality of microcapsules, mixed with said binder, said microcapsules containing a latent repair fluid comprising a film forming component and a corrosion inhibitor.

2. The corrosion protective coating composition of claim 1 wherein said film forming binder is in powdered form.

3. The corrosion protective coating composition of claim 1 further comprising a marker dye contained in said latent repair fluid.

4. The corrosion protective coating composition of claim 1 wherein said corrosion inhibitor is selected form the group consisting of benzimidazole, 1-methylbenzimidazole, 1-phenylbenzimidazole, 2-phenylbenzimidazole, diethylthiophosphate, dioctylthiophosphate, thiourea, allylthiourea, phenylthiourea, 1,3-diphenylthiourea, benzotriazole, benzothiazole metal phosphates, and organophosphates metal phosphonates, metal sulfates and metal sulfonates and mixtures thereof.

5. The corrosion protective coating composition of claim 1 wherein said film forming binder is selected from the group consisting of epoxy resins, polyester resins, polyurethane resins, polyvinylfluorodiene resins, alkyd resins, acrylic resins and nylon.

6. The corrosion protective coating composition of claim 1 wherein said plurality of microcapsules includes shell walls comprising a frangible material having structural integrity at temperatures of least about 160° C.

7. The corrosion protective coating composition of claim 6 wherein said frangible material is selected from the group consisting of cellulosic materials, copolymers of isobornyl methacrylate with (meth) acrylic acid, nylon, polyurethane, polyurea, polycarbonate, and polymers formed from urea, formaldehyde and melamine monomers.

8. The corrosion protective coating composition of claim 1 wherein said microcapsules have a diameter of less than about 75 $\mu$m.

9. The corrosion protective coating composition of claim 8 wherein said microcapsules have a diameter of from about 10 $\mu$m to about 40 $\mu$m.

10. A corrosion protective coating composition, comprising:
   (a) a film forming binder;
   (b) a first plurality of microcapsules containing a corrosion inhibitor, and
   (c) a second plurality of microcapsules containing a film forming component, said first and said second plurality of microcapsules being substantially uniformly distributed throughout said binder.

11. The corrosion protective coating composition of claim 10 further comprising a plurality of microcapsules containing a marker dye.

12. The corrosion protective coating composition of claim 10 wherein said corrosion inhibitor is selected form the group consisting of benzimidazole, 1-methylbenzimidazole, 1-phenylbenzimidazole, 2-phenylbenzimidazole, diethylthiophosphate, dioctylthiophosphate, thiourea, allylthiourea, phenylthiourea, 1,3-diphenylthiourea, benzotriazole, benzothiazole metal phosphates, and organophosphates metal phosphonates, metal sulfates and metal sulfonates and mixtures thereof.

13. The corrosion protective coating composition of claim 10 wherein said film forming binder is selected from the group consisting of epoxy resins, polyester resins, polyurethane resins, polyvinylfluorodiene resins, alkyd resins, acrylic resins and nylon.

14. The corrosion protective coating of claim 10 wherein said plurality of microcapsules includes shell walls comprising a frangible material having structural integrity at temperatures of at least about 160° C.

15. The corrosion protective coating composition of claim 14 wherein said frangible material is selected from the group consisting of cellulosic materials, copolymers of isobornyl methacrylate with (meth) acrylic acid, nylon, polyurethane, polyurea, polycarbonate, and polymers formed from urea, formaldehyde and melamine monomers.

16. The corrosion protective coating composition of claim 10 wherein said microcapsules have a diameter of less than about 75 micrometers.

17. A corrosion protective layer, comprising:
   (a) a continuous resin phase, and
   (b) a plurality of frangible microcapsules, substantially uniformly dispersed in said resin phase, said microcapsules containing a fluid composition to effect repair of said layer when damaged.

18. The corrosion protective layer of claim 17 wherein said fluid composition comprises a corrosion inhibitor and a film forming component.

19. A method for forming the corrosion protective layer of claim 17, comprising the steps of:
   (a) providing a fluid bed comprising a coating powder having an encapsulated corrosion inhibitor;
   (b) heating a substrate to a temperature above the melting point of said coating powder;
   (c) submerging at least a portion of said substrate in said coating powder form a corrosion protective layer over said substrate; and
   (d) withdrawing said substrate from said fluid bed.

* * * * *